R. E. POULTON.
EYEGLASS GUARD.
APPLICATION FILED AUG. 28, 1912.
1,072,494.
Patented Sept. 9, 1913.
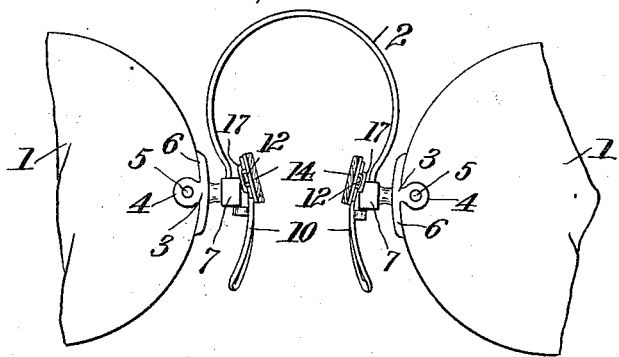
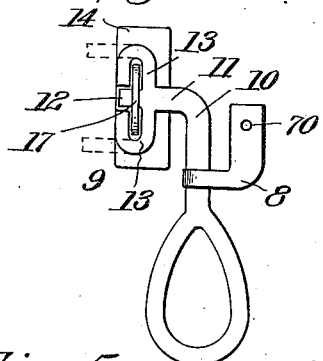
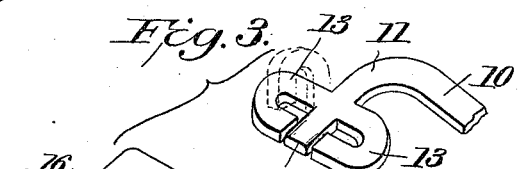
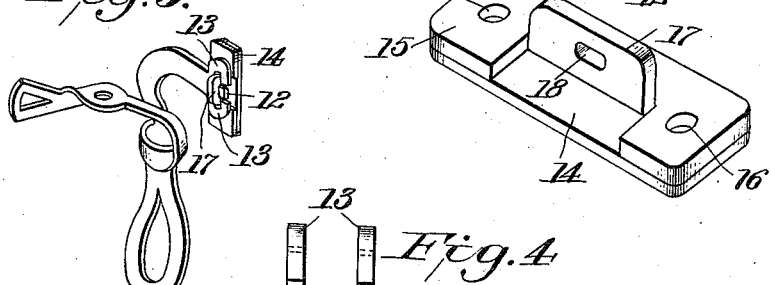
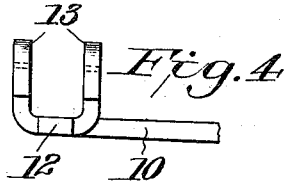
WITNESSES
C. N. Walker
Harry Bowers
Ross E. Poulton
INVENTOR
by S. Brashears
Attorney

UNITED STATES PATENT OFFICE.

ROSS E. POULTON, OF SAVANNAH, GEORGIA, ASSIGNOR TO ISAAC M. SCHWAB, OF SAVANNAH, GEORGIA.

EYEGLASS-GUARD.

1,072,494.   Specification of Letters Patent.   Patented Sept. 9, 1913.

Application filed August 28, 1912. Serial No. 717,652.

*To all whom it may concern:*

Be it known that I, ROSS E. POULTON, a citizen of the United States, residing at Savannah, in the county of Chatham and State of Georgia, have invented certain new and useful Improvements in Eyeglass-Guards, of which the following is a specification.

This invention relates to eyeglasses and particularly to the guards thereof and the object of the invention is to dispense with the necessity of using screws, rivets, or any other fastening not a part of the guards themselves for securing the pads in position on the main guards.

With this object in view the invention consists in a construction of guard provided with means whereby the movable guard or pad may be adjusted and attached to the stationary arm of the guard in a plane substantially vertical, or at a right angle thereto, may be readily renewed or replaced in case of extreme wear or breakage, may be readily adjusted to take up wear in either part, and may swing in substantially any desired plane to accommodate it to differently formed noses, and keep its position after it is adjusted to the nose, all without the necessity of using any fastening other than parts of the guard itself, all as hereinafter fully described and afterward specifically claimed.

My invention may be applied to any of the various forms of eyeglass frames in general use in which the guards are intended for various nasal contours and preserve effective contact therewith, such for instance as the bow spring frames in which the guards are yieldingly pressed against the nose by a bow spring which connects the lenses together, or the form shown in which the lenses are connected by a rigid bow or bridge to rest upon the nose and the pads yieldingly pressed against the nose by springs, or any of the well known forms affording a yielding contact of the pads with the nose.

In order that the construction and operation of my invention may be readily comprehended I have illustrated two of the forms in which it may be embodied, in the accompanying drawings, as examples of the many forms in which it may be utilized.

In the drawings, which are drawn on an enlarged scale, Figure 1 represents, in elevation, a pair of glasses embodying my invention, looking at the inner side of the glasses, the outer portions of the lenses being broken away. Fig. 2 represents one of the guards with the parts attached together, detached from the remainder of the frame, and ready to be attached thereto, looking at the back of the pad. Fig. 3 represents, in perspective, the two parts of the guard separated and ready to be manipulated, as later described, to attach them together, the greater part of the stationary part of the guard being broken away. Fig. 4 represents, in elevation, the end of the stationary part of the guard bent into position to receive the movable part, or pad. Fig. 5, represents, in perspective, another form of guard embodying my invention.

Like reference characters mark the same parts wherever they occur in the drawings.

Referring specifically to Fig. 1 of the drawings, 1 designates the lenses, 2, the spring connecting bow, and 3, the posts or studs constituting the essential or characteristic features of eyeglasses of this form, being frameless, and the posts clamped to the lenses in the usual manner by forks 4, which embrace the lenses, pins or screws 5 which pass through the forks and lenses, and braces 6 extending from the posts in opposite directions and bearing against the edges of the lenses. The posts 3 are provided with heads 7 socketed to receive pins or screws (not shown), which pass through holes 70 in the arms 8 of the guards 9, which arms are preferably integral with and project from about the middle length of the stationary parts, or bars 10, of the guards, and are suitably bent to bring the bars into proper positions relative to the socketed heads of the posts 7 which positions are normally such as to bring the guards on opposite sides of the nose when the glasses are applied thereto, said bars being then substantially vertical. The upper ends of the bars 10 are extended rearwardly, forming substantially horizontal arms 11, which terminate in tongues 12. Extending from the top and bottom sides, or edges, of the arms 11 are prongs 13 which are normally in the same plane as the arms 11 and bars 10 and are of U shape, the outer ends being curved backward and terminating adjacent to the sides of the tongue 12 and at or near the end thereof.

The movable part, or pad, of a guard, is indicated at 14 consisting of a front or face adapted to contact with the nose and a preferably metallic backing 15 secured thereto by any suitable manner as for instance, by pins or screws (not shown) entering holes 16, said backing being bent to form a longitudinal flange 17 at substantially a right angle to the body of the pad.

To attach the bars 10 of the guards, and the pads 14, together, no extraneous fastening devices are necessary, the operation being as follows: In the normal form of the bars 10 and arms 11 as described, said bars and arms being usually stamped out of suitable flat stock, with the U shaped fork prongs 13 and tongues 12 in the same plane with the arms and the tongues not extending beyond the prongs, said tongues would be prevented from entering oblong openings 18 made in flanges 17 to receive said tongues, but when said prongs are bent substantially as shown in Fig. 4 and in dotted lines in Fig. 3, or it might be as shown in dotted lines in Fig. 2, the pads may be passed upon the tongues, the latter entering the openings 18 until the flanges are substantially contacting with the prongs, adjacent to the tongues, when the prongs may be bent back again to substantially the plane of the tongues 12 and arms 11, as shown in full lines in Fig. 2. In these positions, the holes 18 being slightly larger than the tongues, the pads will be movable on the tongues as fulcra, and permitted to swing on said tongues in substantially vertical and substantially horizontal planes, allowing them substantially universal adjustments, within reasonable bounds, to adapt themselves to various nasal conformations and to insure proper contact therewith when pressed thereupon by the elasticity of the spring bow. To remove and replace the pads, it will only be necessary to bend the prongs to the positions shown in full lines in Fig. 4 and in dotted lines in Fig. 3, or, in Fig. 2, when the flanges may be freely slipped off the tongues.

In the form of guard illustrated in Fig. 5, there is no change in the construction of essential parts of the present invention from the corresponding parts shown in the other figures and hereinbefore described, the pad or movable part and the bar or stationary part being identical in all of the figures and their functions being the same, this figure being solely for the purpose of illustrating how my present improvement may be applied to another construction.

I desire it to be understood that my invention may, as before stated, be applied to any form of eyeglasses comprising yieldingly pressed nose pads and that changes in the form, proportions, and arrangement of the specifically described parts may be made, without departing from the spirit and scope of the invention as defined in the appended claims.

Having thus described my invention, what I claim as new and desire to secure by Letters Patent of the United States, is—

1. An eye glass guard comprising a stationary part or bar provided with a tongue at the end thereof, a movable part or pad provided with a flange having an opening larger than the cross-section of the tongue to receive the tongue and permit of a substantially universal movement of the pad on the tongue, and means integral with the bar to secure the pad against displacement from the tongue while permitting of said universal movement.

2. An eye glass guard comprising a stationary part or bar provided with a tongue at the end thereof, a movable part or pad provided with a flange having an opening larger than the cross-section of the tongue to receive the tongue and permit of a substantially universal movement of the pad on the tongue, and means integral with the bar to secure the pad against displacement from the tongue while permitting of said universal movement, said securing means comprising a prong projecting from each side of the bar at the root of the tongue in the plane of the bar and tongue, each prong adapted to be bent back into U shape to embrace the ends of the flange and terminating adjacent to the end of the tongue.

In testimony whereof I affix my signature in presence of two witnesses.

ROSS E. POULTON.

Witnesses:
 JACKSOMA M. FLOOD,
 NATHAN COLEMAN.

---

Copies of this patent may be obtained for five cents each, by addressing the "Commissioner of Patents, Washington, D. C."